Figures 1, 2, 3:
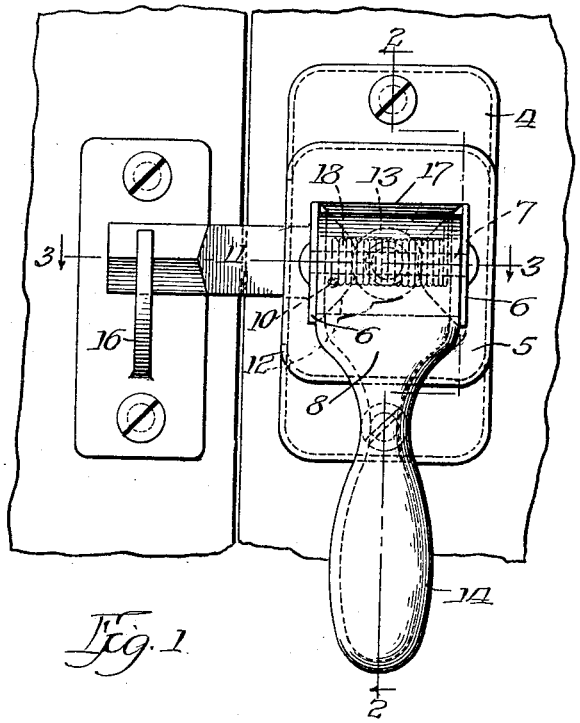

June 23, 1931. G. W. ALDEEN 1,811,449

LATCH

Filed Jan. 31, 1927

Witness:
Inventor
George W. Aldeen
By Ira J. Wilson
Atty

Patented June 23, 1931

1,811,449

UNITED STATES PATENT OFFICE

GEDOR W. ALDEEN, OF ROCKFORD, ILLINOIS, ASSIGNOR TO NATIONAL LOCK CO., OF ROCKFORD, ILLINOIS, A CORPORATION OF DELAWARE

LATCH

Application filed January 31, 1927. Serial No. 164,729.

This invention relates to latches and aims to provide an efficient latch which may be conveniently operated and economically manufactured, and one in which rattle is substantially eliminated between the handle and the latch bar.

Another object of this invention is to provide a latch including a latch housing and operating lever adapted to operate a latch bar in said housing in which the lever is so constructed and mounted in relation to the housing as to effectively cover the entrance of the lever into the housing at all positions of said lever.

Other and further objects of this invention will be apparent after the same becomes better understood and by reference to the description and claims in connection with the accompanying drawings, wherein, Fig. 1 is a plan view of a latch embodying this invention, Fig. 2 is a section taken at the line 2—2 of Fig. 1 and showing parts in elevation, and Fig. 3 is a section taken at the line 3—3 of Fig. 1 and showing parts in elevation.

Referring to the drawings more particularly, numeral 4 indicates a housing for a latch mechanism, said housing being struck from sheet metal to form a central raised portion 5 from which is struck upwardly spaced lugs 6 which support a longitudinal pivot pin 7. The pin 7 in turn supports the latch lever 8, the latter being provided with an extension 9 which extends into the interior of the portion 5 through one of the recesses formed from striking the lugs 6 out of the housing, to actuate a latch bar 11 pivoted within said housing. The portion 12 of the housing between the recesses formed therein when the lugs 6 were struck therefrom is depressed and carries a central pivot 13 which supports the latch 11 on the under side of said portion. The extension 9 extends substantially normal to the handle portion 14 of the lever and engages in the slot 15 in the inner end of the latch bar 11, whereby said lever may actuate said bar from locking or operative position as shown in full lines in Fig. 1 to in-operative or unlocking position, as shown in dotted lines in said figure. The lever 8 is in the full line position shown in Fig. 2 when the bar 11 is in the operative position shown in full lines in Fig. 1 and similarly said lever is in the outer or dotted line position shown in Fig. 2 when said latch bar is in the inoperative or dotted line position shown in Fig. 1. A keeper 16 is adapted to be engaged by said latch bar when the same is in the operative or full line position shown in Fig. 1.

In order to effectively close the recesses formed by s striking the lugs 6 from said housing, one of which recesses incidentally provides an entrance for the extension 9, the lever 8 is formed with an enlarged rounded head portion 17 of sufficient width to fit between the lugs 6. As is heretofore stated, the portion 12 is depressed and receives the portion 17 or a part thereof when the lever 8 is actuated about its pivot, thereby affording together with said portion 17 an effectual cover for the openings in the top of the housing 5 at all positions of said lever.

A spring 18 surrounds the pivot pin 7, one end as shown in Fig. 3 extending into an aperture 10 in the bar 11 to the left of the pivot thereof for normally holding said bar in full line or operative position, as shown in Fig. 1. The other end of the spring 18, as shown in Fig. 2, abuts the lever 8 at the side of the pivot thereof, opposite to the handle 14 whereby said spring normally holds said lever in the inner or full line position shown in Fig. 2. Thus the spring 18 is interposed between the lever 8 and the latch bar acting directly upon each, to eliminate rattle between them as well as to normally yieldably hold both in their operative positions.

I am aware that many changes may be made through a wide range, without departing from the principles of this invention, and I, therefore, do not wish to be limited to the details shown and described.

I claim:

1. In a latch, the combination of a housing, a pivotally movable latch bar, an operating lever connected to said bar, and a spring disposed in said housing and in direct contact with both said lever and bar for yieldably holding both in predetermined position and so connected to said lever and bar that a movement of either from its respective predetermined position causes an increase in the potential of the spring acting upon the other.

2. A latch comprising a housing, a latch bar and an operating lever therefor both pivotally carried by said housing and, a single spring disposed in said housing and acting on both said bar and said lever to yieldably retain the same in predetermined position and to prevent lost motion between them.

3. In a latch, a housing, a pivotally mounted latch bar adapted to be moved to a plurality of positions, an operating lever connected to said bar for actuating the same to its different positions, and a spring disposed in said housing and acting directly upon and between both said lever and bar for yieldably holding the latter in one of said positions and the lever in its corresponding position.

4. In a latch, a housing, a pivotally mounted latch bar adapted to be moved to a plurality of positions, an operating lever connected to said bar for actuating the same to its different positions, and a spring disposed in said housing and having one end acting directly upon said lever and the other end acting directly on said bar for yieldably holding the latter in one of said positions and the lever in its corresponding position.

5. In a latch, a latch bar adapted to be moved to a plurality of positions, a pivotally mounted operating lever connected to said bar for actuating the same, and a spring surrounding the pivot of said lever and acting directly upon both said lever and bar for yieldably holding the latter in one of said positions and said lever in its corresponding position.

6. In a latch, the combination of a housing, a latch bar operable within said housing, a pair of lugs struck upwardly from said housing, and an operating lever for said bar pivotally carried by said lugs and having an extension extending into the housing for actuating said bar, the portion of said housing between said lugs being depressed, the lever having an enlarged portion near the end thereof presenting an exterior surface which is adapted to substantially cover said depressed portion and proximity thereto when said lever is actuated to operate said bar, said bar being pivotally carried by said depressed portion.

7. In a latch, the combination of a housing, a pair of lugs struck upwardly out of said housing, a lever pivotally carried by said lugs and having an extension extending into the housing, and a latch bar pivotally carried by that portion of said housing between the lugs and adapted to be operated by said extension.

8. In a latch, the combination of a housing, an operating lever mounted exteriorly of said housing and having an extension extending into the housing, the portion of the housing directly beneath said lever being depressed, said lever having an enlarged portion adjacent the pivot thereof presenting an exterior surface which is adapted to substantially cover said depressed portion and to be carried in proximity thereto when said lever is actuated, and a latch bar pivotally carried by said depressed portion and adapted to be actuated by said extension.

9. In a latch, the combination of a housing, an operating lever mounted exteriorly of said housing and having an extension extending into the housing, the portion of the housing directly beneath said lever being depressed, said lever having an enlarged portion adjacent the pivot thereof presenting an exterior surface which is adapted to substantially cover said depressed portion and to be carried in proximity thereto when said lever is actuated, and a latch bar operable in said housing and adapted to be actuated by said extension.

10. In a latch, the combination of a housing, a latch bar operable within said housing, and an operating lever for said bar mounted exteriorly of said housing and having an extension extending into the housing for actuating said bar, said lever and housing being formed with integral portions thereto arranged to close the entrance of said lever into said housing at all positions of the lever.

In witness of the foregoing I affix my signature.

GEDOR W. ALDEEN.